(12) United States Patent
Kobacker, II et al.

(10) Patent No.: US 7,648,317 B2
(45) Date of Patent: Jan. 19, 2010

(54) MOTORCYCLE TRANSPORT STAND

(75) Inventors: Alfred J. Kobacker, II, Blacklick, OH (US); Gary P. Zimmerman, Pataskala, OH (US)

(73) Assignee: Abranda, LLC., Columbus, OH (US)

( * ) Notice: Subject to any disclaimer, the term of this patent is extended or adjusted under 35 U.S.C. 154(b) by 490 days.

(21) Appl. No.: 11/655,418

(22) Filed: Jan. 19, 2007

(65) Prior Publication Data
US 2008/0174088 A1 Jul. 24, 2008

(51) Int. Cl.
*B60P 3/075* (2006.01)
(52) U.S. Cl. .......................................... 410/3
(58) Field of Classification Search ............... 410/2, 410/3, 7, 9, 10, 19, 22, 80; 254/131; 211/5, 211/17, 20, 22, 23, 24; 224/924, 533, 403, 224/42.12, 567, 568; 414/463; 248/499, 248/500
See application file for complete search history.

(56) References Cited

U.S. PATENT DOCUMENTS

| | | | | |
|---|---|---|---|---|
| 3,785,517 A | * | 1/1974 | Brajkovich | 414/462 |
| 4,437,597 A | * | 3/1984 | Doyle | 224/533 |
| 5,735,410 A | * | 4/1998 | Kallstrom | 211/20 |
| 6,099,219 A | * | 8/2000 | Bartholomay | 410/20 |
| 7,287,942 B1 | * | 10/2007 | Valkenburgh | 410/3 |
| 2006/0163543 A1 | * | 7/2006 | Kobacker et al. | 254/131 |
| 2008/0226410 A1 | * | 9/2008 | Valkenburgh | 410/3 |

* cited by examiner

*Primary Examiner*—H Gutman
(74) *Attorney, Agent, or Firm*—Thomas S. Baker, Jr.

(57) ABSTRACT

A motorcycle transport stand has cycle support arms that move between a load position in which they are spaced apart a greater distance to receive the rear wheel of a motorcycle and a secured position in which they are spaced apart a lesser distance to prevent excessive lateral movement of the motorcycle rear wheel.

23 Claims, 4 Drawing Sheets

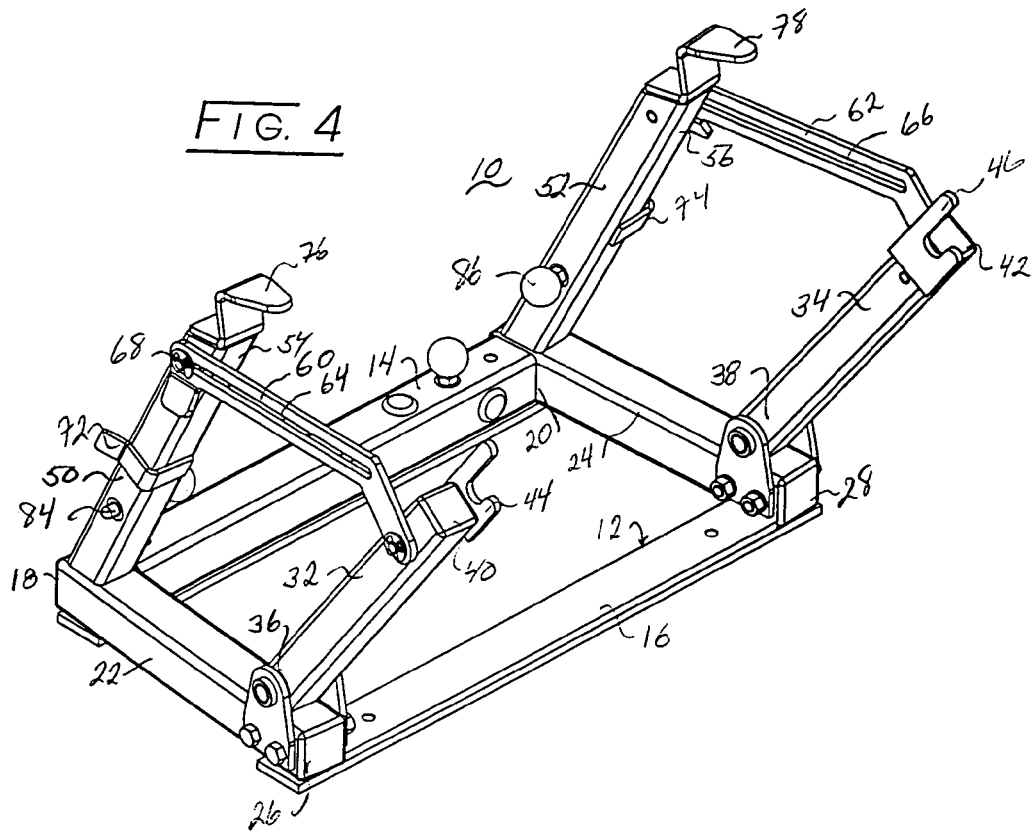
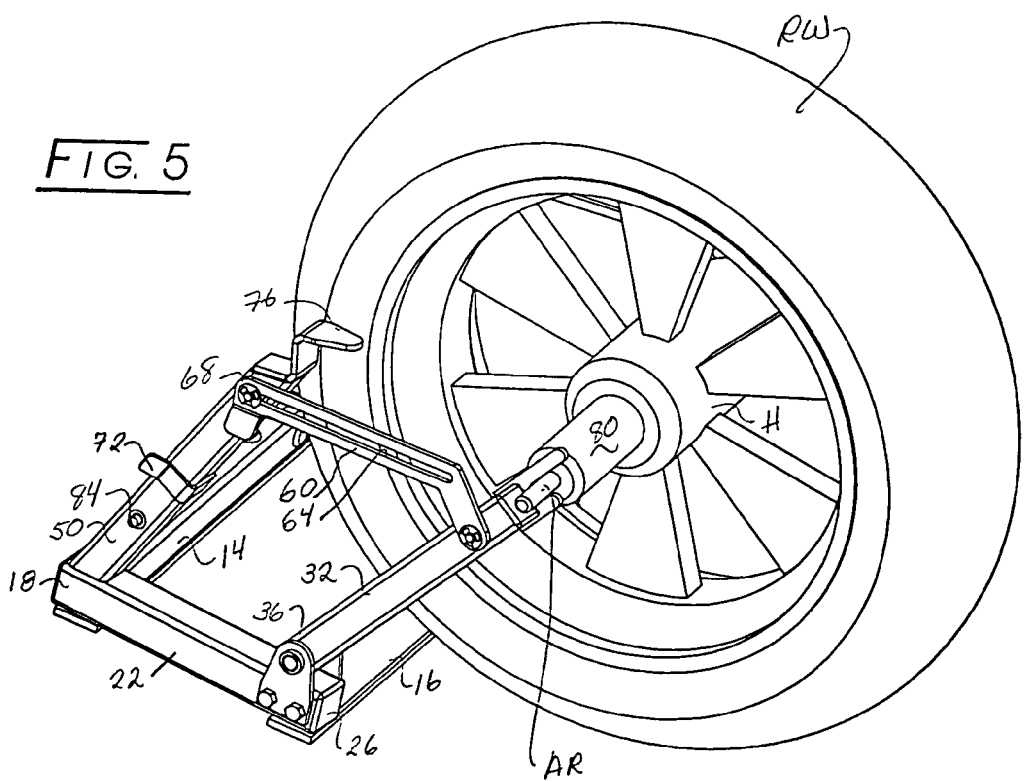

MOTORCYCLE TRANSPORT STAND

CROSS-REFERENCES

None.

FIELD OF THE INVENTION

This invention relates to a transport stand used to secure a motorcycle when it is transported on a motor vehicle or trailer.

BACKGROUND OF THE INVENTION

The function of a motorcycle transport stand is to secure a motorcycle while it is being transported. In most cases, a motorcycle is transported on the bed of a motor vehicle such as a truck or trailer. There are a number of different motorcycle transport stands.

One type of motorcycle transport stand clamps on the front wheel of a motorcycle. Typically, elastic and non-elastic straps are used in conjunction with a front wheel transport stand to tie down and further secure the motorcycle.

Some motorcycle transport stands secure the rear wheel of a motorcycle. One known transport stand incorporates ramps which engage opposite sides of an axle rod projecting from the axle or hub of a motorcycle rear wheel to enable the user to raise the rear wheel off the ground and thereafter secure the axle rod within the stand.

In order to accommodate motorcycles having rear wheels with different widths, spacers are added to the opposite sides of the axle rod to prevent excessive lateral movement of the rear wheel when the axle rod is secured within the transport stand. Since the distance between the sides of the transport stand are fixed, the motorcycle rear wheel and the axle rod and spacers projecting from opposite sides of the hub must be precisely centered as the axle rod moves up the ramps to a secured position in which the opposite sides of the axle rod are clamped to the transport stand. Because of the weight of the motorcycle and the difficulty in moving the axle rod which bears the weight of the rear end of the motorcycle up the ramps to a secured position, it is sometimes necessary to make repeated attempts to precisely align or center the motorcycle rear wheel within the transport stand.

It is desirable to provide a rear wheel engaging motorcycle transport stand that can accommodate mis-alignment of a motorcycle rear wheel and its axle rod and spacers, that is self aligning and that allows the user to easily elevate the rear wheel of a motorcycle and secure it in a position within the transport stand.

SUMMARY OF THE INVENTION

A transport stand for a motorcycle having an axle rod projecting from the opposite sides of a rear wheel has a base, first and second cycle support arms having inner and outer ends and moveably attached to the base, a cycle engagement member affixed to the outer ends of each of the first and second cycle support arms and the first and second cycle support arms are moveable between a load position in which the outer ends of the first and second cycle support arms are spaced a greater distance to enable said first and second cycle engagement members to engage opposite ends of an axle rod extending through a motorcycle rear wheel axle when the rear wheel is on a support surface and a secured position in which the outer ends of the first and second cycle support arms are spaced apart a lesser distance such that the first and second cycle engagement members are moved inwardly from opposite ends of the axle rod towards the sides of the rear wheel to prevent excessive lateral movement thereof.

DESCRIPTION OF THE DRAWINGS

FIG. 4 is a perspective view of the motorcycle transport stand with the cycle support arms in the load position;

FIG. 5 is a view similar to FIG. 4 illustrating a motorcycle axle rod received in a cycle engagement member on the outer end of a cycle support arm;

DESCRIPTION OF THE PREFERRED EMBODIMENT

Figure 1:
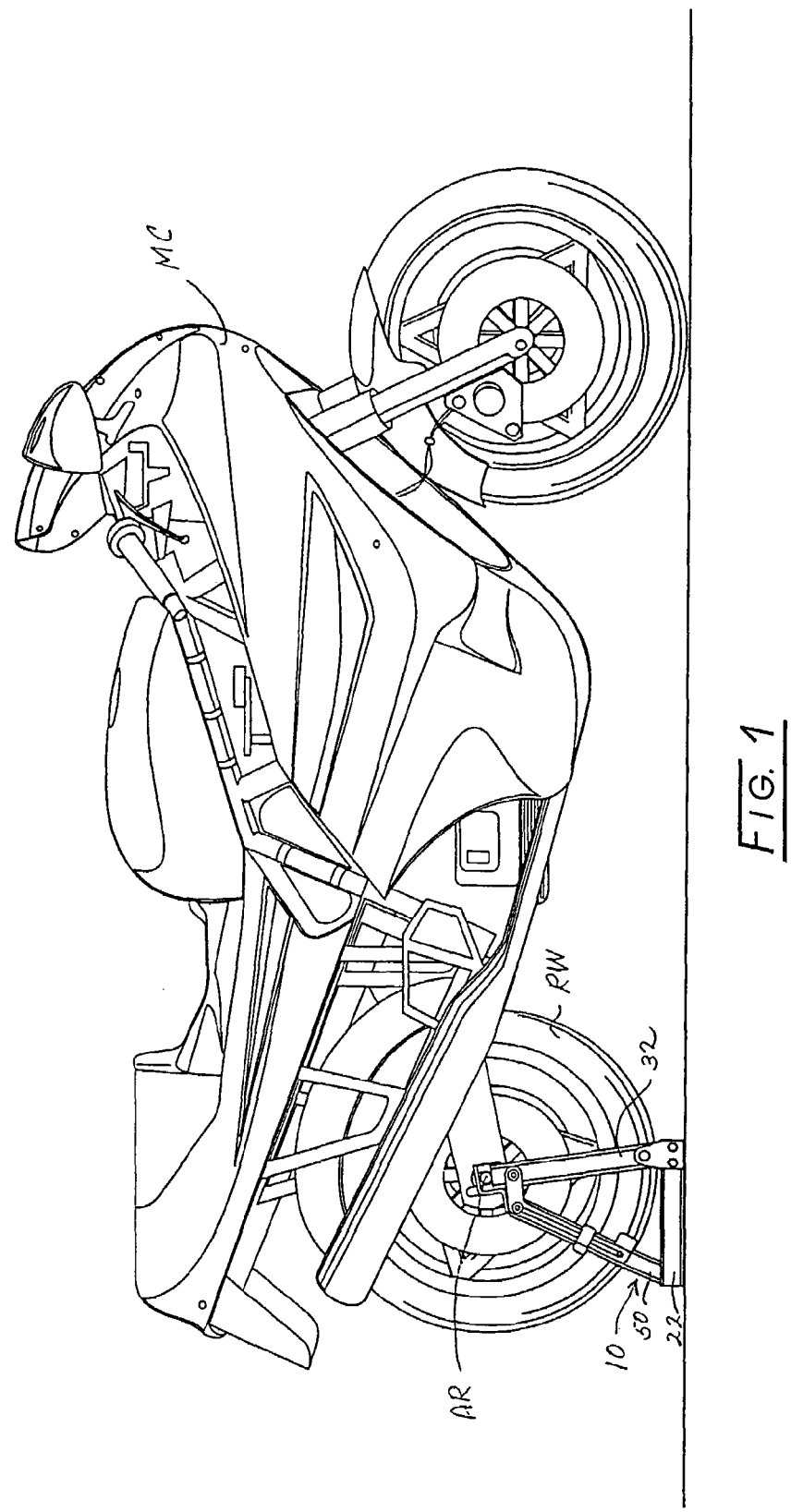
FIG. 1 is a side elevation of a motorcycle in the secured position on the motorcycle transport stand of the instant invention.

Referring to FIG. 1 of the drawings, a motorcycle MC is shown having its rear wheel RW elevated with an axle rod AR which passes through the axle or hub of rear wheel RW and projects from opposite sides thereof mounted in the secured position on the motorcycle transport stand 10 of the instant invention.

Figure 3:
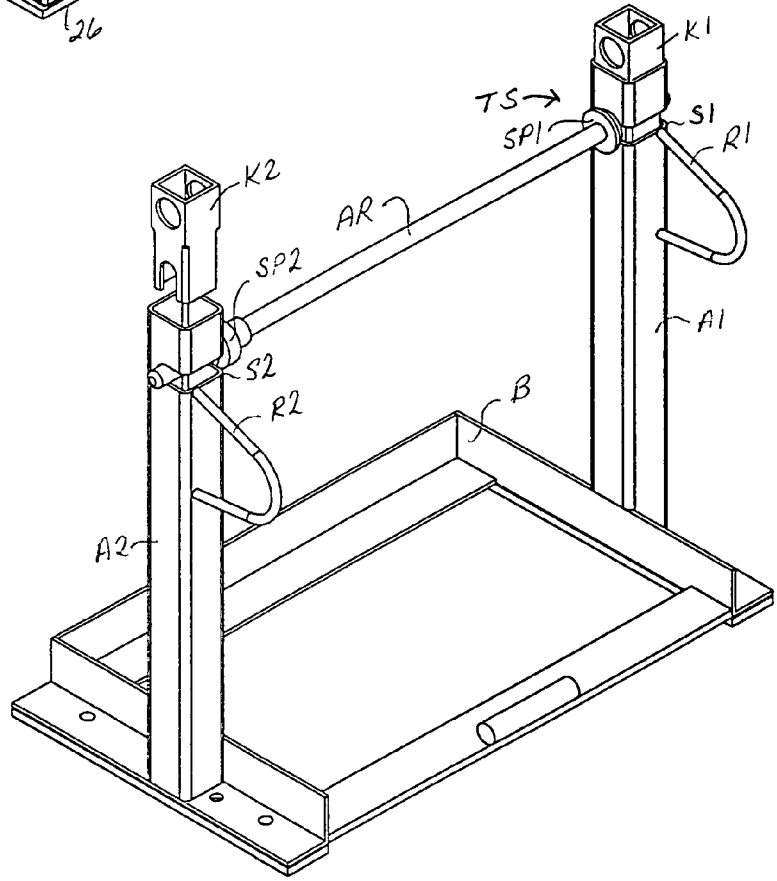
FIG. 3 is a perspective view of a prior art motorcycle transport stand.
Figure 6:
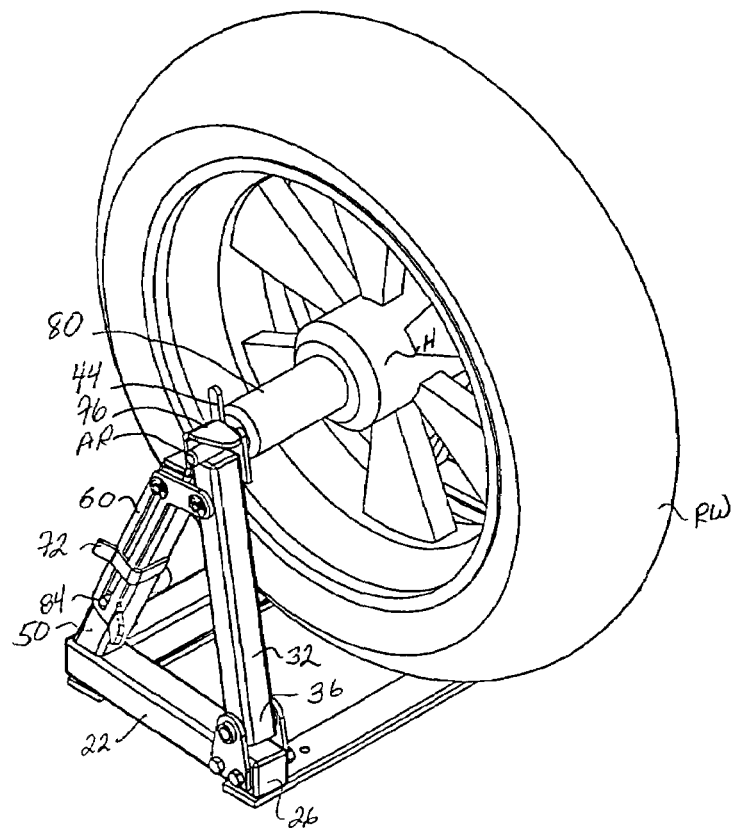
FIG. 6 is a perspective view similar to FIG. 2 with a motorcycle axle rod received in the cycle engagement member affixed to the outer end of a cycle support arm.

FIG. 3 illustrates a prior art motorcycle transport stand TS which provides ramps R1 and R2 which are adapted to be engaged by an axle rod AR that passes through a motorcycle rear axle and projects from opposite sides thereof to enable the axle rod AR to be elevated and thereby raise the rear wheel of the motorcycle and thereafter secured in the transport stand. Prior art transport stand TS has a rectangular base B and a pair of vertical upright arms A1 and A2 which project upwardly from opposite sides of base B. Ramps R1 and R2 are affixed to the outer ends of arms A1 and A2. In use, a user backs a motorcycle towards transport stand TS such that axle rod AR engages the lower end of ramps R1 and R2. The user continues to push the motorcycle towards transport stand TS to cause axle rod AR to move up ramps R1 and R2 to a position in which the ends of the axle rod AR engage slots S1 and S2 formed in the outer ends of arms A1 and A2. Keepers K1 and K2 enter the hollow outer ends of arms A1 and A2 and engage the outer ends of axle rod AR to retain the rod in a motorcycle rear wheel elevated position.

In order to accommodate different widths of motorcycle rear wheels, arms A1 and A2 are spaced a sufficient distance to accommodate the largest motorcycle rear wheels likely to be mounted on the transport stand TS. To accommodate smaller motorcycle rear wheels, spacers SP1 and SP2 are inserted on opposite ends of axle rod AR to take up the excess distance from the motorcycle hub to the transport stand arms A1 and A2. The spacers SP1 and SP2 prevent excessive lateral movement of the motorcycle rear wheel when the motorcycle is being transported. One problem with using transport stand TS is that the motorcycle rear wheel axle rod AR and spacers SP1 and SP2 must be precisely aligned with the slots S1 and S2 as the axle rod AR moves up the ramps R1 and R2 such that the spacers SP1 and SP2 fit between arms A1 and A2. Such precise alignment is somewhat difficult to achieve, because as the motorcycle is pushed towards the transport stand and the axle rod AR is moving up the slope of the ramps R1 and R2, the motorcycle rear end tends to move to one side or the other. Consequently, it is often necessary to make repeated attempts to properly align axle rod AR and spacers SP1 and SP2 with slots S1 and S2 as the axle rod is moved up the transport stand's ramps R1 and R2. Additionally, a large amount of force is required to move the motorcycle towards transport stand TS as the axle rod is moving up ramps R1 and R2.

The motorcycle transport stand 10 of the present invention eliminates the need for precise alignment of an axle rod and spacers projecting from opposite sides of a motorcycle rear wheel as it is moved from a load position to a secured position on transport stand 10 and makes it easier to move a motorcycle towards the transport stand as the rear wheel is being elevated, as will now be described.

Turning again to the drawings, it may be seen that motorcycle transport stand 10 has a generally trapezoidal shaped base 12. Base 12 is formed from a pair of generally parallel aligned rear and front braces 14 and 16, with rear brace 14 connected at one end to the inner end 18 of a base side 22 and at the other end to the inner end 20 of a base side 24. One end of front brace 16 is connected to the outer end 26 of base side 22 and the other end is connected to the outer end 28 of base side 24. From the above, it may be seen that base sides 22 and 24 are non-parallel. The distance between the inner ends 18 and 20 of base sides 22 and 24 is less than the distance between the outer ends 26 and 28 of base sides 22 and 24. In the preferred embodiment, base sides 22 and 24 extend at angles 30 and 30' of approximately 95° with respect to rear brace 14.

A pair of cycle support arms 32 and 34 are pivotally attached at their respective inner ends 36 and 38 to the outer ends 26 and 28 of base sides 22 and 24. Cycle support arms 32 and 34 pivot in axial or longitudinal alignment with respect to the base sides 22 and 24 to which they are pivotally attached. The outer ends 40 and 42 of the respective cycle support arms 32 and 34 each mount a cycle engagement member 44 and 46, respectively, having a recess adapted to receive an axle rod AR therein.

Figure 2:
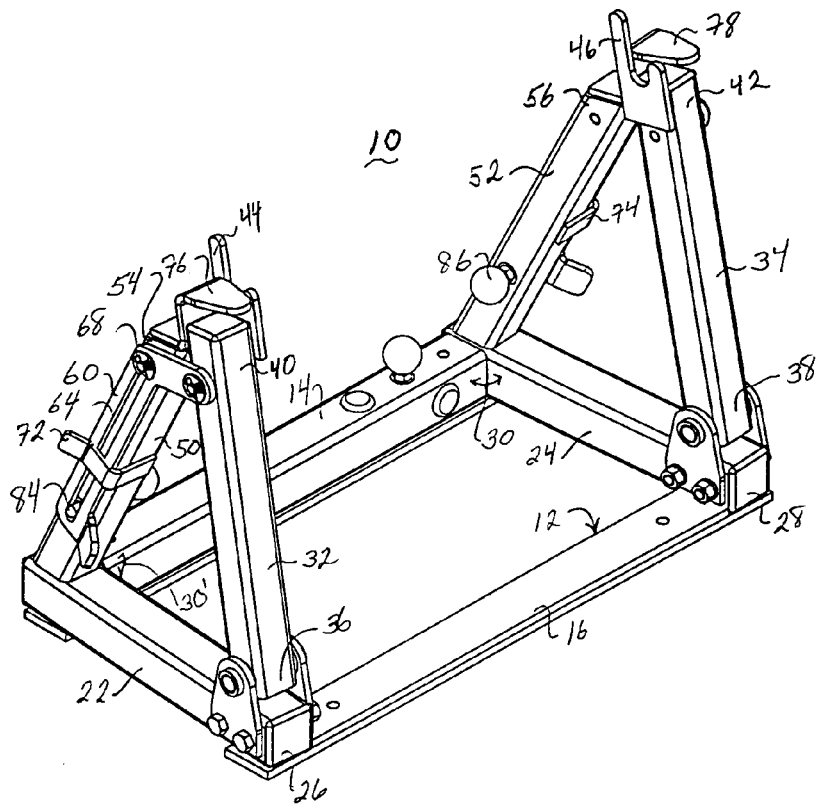
FIG. 2 is a perspective view of the motorcycle transport stand with the support arms in the secured position.

Stop elements 50 and 52 are rigidly affixed at their inner ends to the respective inner ends 18 and 20 of base sides 22 and 24. Stop elements 50 and 52 project forwardly towards cycle support arms 32 and 34 in parallel alignment with the base sides 22 and 24. In other words, the outer ends 54 and 56 of the respective stop elements 50 and 52 overlie the base sides 22 and 24 intermediate the inner 18 and 20 and outer 26 and 28 ends towards the respective cycle support arms 32 and 34. It may be seen that base side 22, stop element 50 and cycle support arm 32 all reside in a single plane as do base side 24, stop element 52 and cycle support arm 34. Referring to FIG. 2, it may be seen that when the motorcycle transport stand 10 is in the secured position, as described herein below, base side 22, stop element 50 and cycle support arm 32 form a triangular-shaped structure, as do base side 24, stop element 52 and cycle support arm 34.

Elongated guide legs 60 and 62 are pivotally connected at one end to the outer ends 40 and 42 of the cycle support arms 32 and 34, respectively. Guide legs 60 and 62 have elongated slots 64 and 66, respectively, formed therein which receive pins 68 and 70 rigidly affixed to the outer ends of stop elements 50 and 52. Guide legs 60 and 62 and pins 68 and 70 function to limit the forward movement of cycle support arms 32 and 34 and to guide the cycle support arms 32 and 34 in parallel alignment with their respective base sides 22 and 24 and their respective stop elements 50 and 52. When the cycle support arms 32 and 34 are in the secured position, one end of the guide legs 60 and 62 is received within a clip 72 and 74, respectively and keepers 76 and 78 mounted at the outer ends of stop elements 50 and 52 overlie cycle engagement members 44 and 46, respectively, to secure the ends of the axle rod AR therein. Additionally, lock elements 84 and 86 which may be spring loaded pins mounted on the stop elements 50 and 52, respectively, pass through the elongated guide leg slots 64 and 66, respectively, to further secure the guide legs 60 and 62 and to ensure the motorcycle rear wheel RW remains in the secured position.

Figure 7:
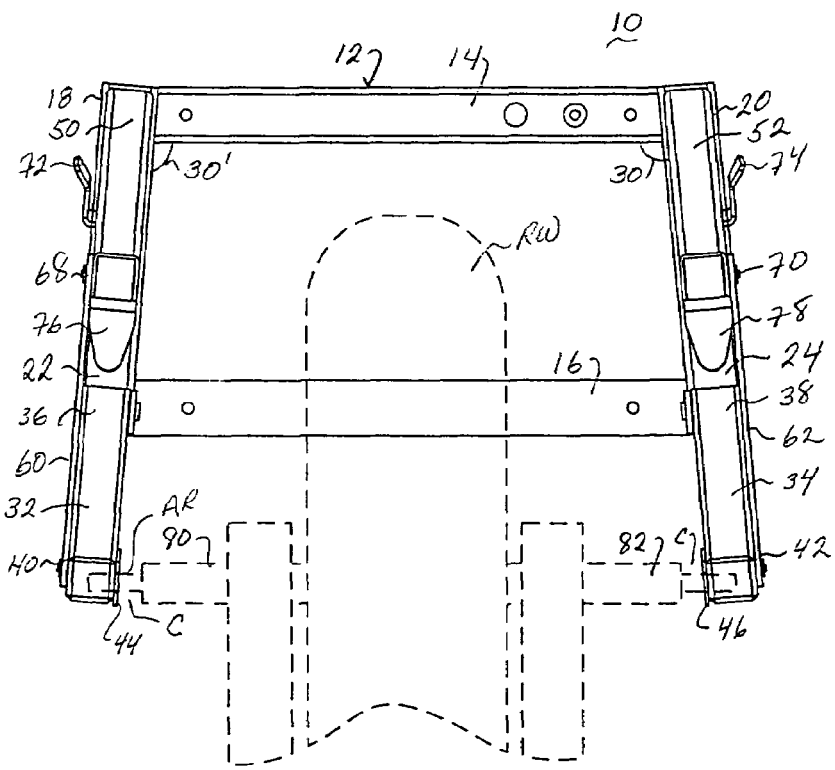
FIG. 7 is a plan view of the motorcycle transport stand of FIG. 5.

Operation of the motorcycle transport stand 10 of the instant invention now will be described. As mentioned above, because motorcycle rear wheel hubs have different widths, spacers, shown in FIG. 7, are mounted on axle rod AR on opposite sides of the hub H of rear wheel RW to prevent excessive lateral movement of the motorcycle rear wheel when the motorcycle transport stand 10 is in the secured position. Thus, prior to operation of the motorcycle transport stand 10, the appropriate spacers 80 and 82 are inserted on axle rod AR. Thereafter, cycle support arms 32 and 34 are moved forwardly to the load position depicted in FIGS. 4, 5 and 7. Forward movement of cycle support arms 32 and 34 is limited by guide legs 60 and 62, as shown in the drawings. Thereafter, the motorcycle is moved towards the motorcycle transport stand 10 until the ends of axle rod AR are received within the cycle engagement members 44 and 46, as best shown in FIG. 7. It was noted previously, the diverging angles of base sides 22 and 24 with respect to rear brace 14 and the respective cycle support arms 32 and 34 cause the outer ends 40 and 42 of the cycle support arms 32 and 34 to be spaced a greater distance in the load position than in the secured position. Consequently, there is an increased clearance C between the ends of the spacers 80 and 82 and the cycle engagement members 44 and 46 at the outer ends of the cycle support arms 32 and 34, as depicted in FIG. 7. This increased clearance C makes it unnecessary to precisely align the motorcycle rear wheel RW and the axle rod AR and spacers 80 and 82 with the cycle engagement members 44 and 46. In other words, the rear wheel RW and axle rod spacers 80 and 82 may be off center somewhat with respect to the motorcycle transport stand 10 in the load position.

Subsequent to the ends of the axle rod AR being received in the cycle engagement member 44 and 46, the operator continues to push the motorcycle towards the motorcycle transport stand 10 rear brace 14. As this occurs, the cycle support arms 32 and 34 pivot about the outer ends 26 and 28 of their respective base sides 22 and 24, thereby lifting the axle rod AR and motorcycle rear wheel RW. As the axle rod AR is lifted, cycle support arms 32 and 34 pivot towards their respective stop elements 50 and 52. This causes the outer ends 40 and 42 of the cycle support arms 32 and 34 to pass over center and to move rearwardly until they engage the stop elements outer ends 54 and 56, respectively. As the cycle support arms 32 and 34 are moving towards the stop element outer ends 54 and 56, they are converging or moving towards each other. As this occurs, the ends of the spacers 80 and 82 are moved closer to cycle engagement members 44 and 46 to center rear wheel RW and to prevent excessive lateral movement of the motorcycle rear wheel RW in the secured position. In the secured position, the outer ends 40 and 42 of cycle support arms 32 and 34 engage the outer end of the stop elements 50 and 52, keepers 76 and 78 overlie opposite ends of axle rod AR and guide legs 60 and 62 are secured in position by clips 72 and 74 and lock elements 84 and 86 on the respective stop elements 50 and 52.

When it is desired to remove the motorcycle rear wheel RW from the motorcycle transport stand 10, the lock elements 84 and 86 are moved to retract their pins from the guide legs 60 and 62 and an operator simply pulls the motorcycle in a forward direction away from the transport stand. This will cause the cycle support arms 32 and 34 to move in a clockwise direction, as viewed in FIGS. 4 and 5, such that cycle engagement members 44 and 46 again pass over center in diverging paths as they move from the secured position to the load position, depicted in those Figures.

From the above, it may be seen that the motorcycle transport stand 10 of the instant invention provides a means to easily move a motorcycle rear wheel RW and its respective axle rod AR and spacers 80 and 82 onto the motorcycle transport stand 10 without the need for precise alignment therewith and the transport stand 10 automatically aligns the motorcycle rear wheel RW as it is being raised and secures the motorcycle rear wheel RW elevated above the ground when in the appropriate position.

Various changes may be made to the size, shape, and relative proportions of the different invention elements disclosed and described herein without departing from the scope, meaning, or intent of the claims which follow.

I claim:

1. A transport stand for a motorcycle having an axle rod projecting from the opposite sides of a rear wheel which comprises:
   a base;
   first and second cycle support arms having inner and outer ends and moveably attached to said base;
   a cycle engagement member affixed to the outer ends of each of said first and second cycle support arms; and
   said first and second cycle support arms moveable between a load position in which the outer ends of said first and second cycle support arms are spaced apart a first distance to enable said first and second cycle engagement members to engage opposite ends of said axle rod when the rear wheel is on a support surface and a secured position in which the outer ends of said first and second cycle support arms are spaced apart a second distance less than said first distance such that said first and second cycle engagement members are moved inwardly from opposite ends of said axle rod towards the sides of said rear wheel to prevent excessive lateral movement thereof.

2. The transport stand of claim 1 wherein said first and second cycle support arms move in non-parallel planes between said load position and said secured position.

3. The transport stand of claim 1 further comprising first and second stop elements wherein said first and second cycle support arms engage said first and second stop elements respectively when said cycle support arms are in said secured position.

4. The transport stand of claim 3 wherein said first and second stop elements have inner and outer ends, said stop elements are rigidly affixed at their inner ends to said base and said first and second cycle support arms engage said outer ends of said stop elements when said cycle support arms are in said secured position.

5. The transport stand of claim 3 further comprising a retainer for retaining said first and second cycle support arms in said secured position.

6. The transport stand of claim 5 wherein said retainer further comprises a guide leg for guiding at least one of said cycle support arms into contact with one of said stop elements.

7. The transport stand of claim 6 wherein said retainer further comprises a pin which engages said guide leg.

8. A transport stand for a motorcycle having an axle rod projecting from the opposite sides of a rear wheel which comprises:
   a base with a pair of spaced non-parallel aligned sides having front and rear ends;
   first and second cycle support arms having inner and outer ends with the inner end of each cycle support arm pivotally attached to the front end of one of said base sides;
   a cycle engagement member affixed to the outer end of each of said first and second cycle support arms;
   first and second stop elements affixed one to each of said base sides; and
   said first and second cycle support arms moveable between a load position in which the outer ends of said first and second cycle support arms are spaced apart a first distance to enable said first and second cycle engagement members to engage opposite ends of the axle rod when the rear wheel is on a support surface and a secured position in which the motorcycle rear wheel is elevated from the support surface and the outer ends of said first and second cycle support arms are spaced apart a second distance less than said first distance and engage said first and second stop elements respectively such that said first and second cycle engagement members are moved inwardly from the ends of said axle rod towards the opposite sides of said rear wheel to prevent excessive lateral movement thereof.

9. The transport stand of claim 8 further comprising a retainer for retaining said first and second cycle support arms in said secured position.

10. The transport stand of claim 9 wherein said retainer further comprises a guide leg for guiding one of said cycle support arms into contact with one of said stop elements.

11. The transport stand of claim 10 wherein said retainer further comprises a pin which engages said guide leg.

12. The transport stand of claim 8 wherein said first and second cycle support arms move in non-parallel planes between said load position and said secured position.

13. The transport stand of claim 8 wherein said first and second cycle support arm cycle engagement members move over center when said first and second cycle support arms move from said load position to said secured position.

14. A transport stand for a motorcycle having an axle rod projecting from the opposite sides of a rear wheel which comprises:
   a base with first and second spaced sides each having front and rear ends wherein said first and second side front ends are spaced apart a greater distance than said first and second side rear ends;
   first and second cycle support arms having inner and outer ends with the inner end of said first and second cycle support arms pivotally attached to the front end of one of said first and second base sides respectively;
   a cycle engagement member affixed to the outer end of each of said first and second cycle support arms; and
   said first and second cycle support arms moveable between a load position in which the outer ends of said first and second cycle support arms are spaced apart a first distance to enable said first and second cycle engagement members to engage opposite ends of the axle rod when the rear wheel is on a support surface and a secured position in which the motorcycle rear wheel is elevated from the support surface and the outer ends of said first and second cycle support arms are spaced apart a second distance less than said first distance such that said first and second cycle engagement members are moved inwardly from the end of said axle rod towards the opposite sides of said rear wheel to prevent excessive lateral movement thereof.

15. The transport stand of claim 14 further comprising first and second stop elements wherein each stop element is mounted at the rear end of one of said base sides.

16. The transport stand of claim 15 wherein each of said stop elements is mounted on said base at an angle and projects forwardly towards the cycle support arm mounted on the respective base side and said first and second cycle support arms engage said first and second stop elements when in the secured position.

17. The transport stand of claim 16 wherein said first and second cycle support arms cooperate with said first and second stop elements and said base sides to form a triangular shaped structure when in the secured position.

18. A transport stand for a motorcycle having an axle rod projecting from the opposite sides of a rear wheel which comprises:
  a base in the shape of a trapezoid having a pair of spaced sides with inner and outer ends, a rear brace connecting the inner ends of said sides and a front brace connecting the outer ends of said sides;
  first and second cycle support arms having inner and outer ends with the inner end of each arm being pivotally attached to the outer ends of said base sides to enable the outer ends of said arms to move forwardly of said front brace and rearwardly of said front brace;
  a cycle engagement member at the outer ends of each of said first and second cycle support arms;
  a pair of stop elements having inner and outer ends with the inner end of each stop element affixed to the inner end of each of said base sides such that the stop elements form an acute angle with their respective base sides; and
  said first and second cycle support arms pivotable between a load position in which the outer ends of said first and second cycle support arms are lowered and positioned forwardly of said front brace and spaced a first distance to enable said first and second cycle engagement members to engage opposite ends of the axle rod when the rear wheel is on a support surface and a secured position in which the outer ends of said first and second cycle support arms are raised and positioned rearwardly of said front brace into engagement with said stop elements, and spaced apart a second distance less than the first distance such that said first and second cycle engagement members are moved inwardly from the ends of said axle rod towards the opposite sides of said rear wheel to prevent excessive lateral movement thereof.

19. The transport stand of claim 18 further comprising a keeper affixed to the outer end of each of the stop elements which overlies the respective first and second cycle engagement member to retain the axle rod ends therein when said first and second cycle support arms are in said secured position.

20. The transport stand of claim 18 further comprising a guide leg affixed to at least one of said cycle support arms and one of said stop elements to cause said cycle support arms to remain in a generally parallel orientation with respect to said base sides as said cycle support arms pivot between said load position and said secured position.

21. The transport stand of claim 20 further comprising a leg retainer for preventing movement of said guide leg when said cycle support arms are in said secured position.

22. The transport stand of claim 18 wherein said cycle engagement members pass over center when moving from said load position to said secured position.

23. The transport stand of claim 18 wherein said first and second cycle support arms cooperate with said first and second stop elements and said base sides to form a triangular shaped structure when in the secured position.

* * * * *